(12) United States Patent
Buckingham et al.

(10) Patent No.: US 11,687,934 B1
(45) Date of Patent: *Jun. 27, 2023

(54) DYNAMIC RISK ASSESSMENT FOR SECURITY FEATURES

(71) Applicant: United Services Automobile Association (USAA), San Antonio, TX (US)

(72) Inventors: Thomas Bret Buckingham, Fair Oaks Ranch, TX (US); Jonathan G. Walters, San Antonio, TX (US); Jeffrey Walton Easley, San Antonio, TX (US); Lee Adams, Shavano Park, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,293

(22) Filed: Aug. 18, 2021

Related U.S. Application Data (63) Continuation of application No. 15/592,386, filed on May 11, 2017, now Pat. No. 11,120,450.

(60) Provisional application No. 62/334,527, filed on May 11, 2016.

(51) Int. Cl.
G06Q 20/40 (2012.01)

(52) U.S. Cl.
CPC ... *G06Q 20/40145* (2013.01); *G06Q 20/4016* (2013.01)

(58) Field of Classification Search
CPC .................. G06Q 20/40145; G06Q 20/4016
USPC .......................................................... 705/44
See application file for complete search history.

(56) References Cited

U.S. PATENT DOCUMENTS

| | | | | |
|---|---|---|---|---|
| 9,979,744 | B1* | 5/2018 | Casillas | G06F 21/31 |
| 11,120,450 | B1* | 9/2021 | Buckingham | G06Q 20/385 |
| 2002/0023217 | A1 | 2/2002 | Wheeler et al. | |
| 2004/0123127 | A1* | 6/2004 | Teicher | G06F 21/78 |
| | | | | 713/193 |
| 2007/0250920 | A1* | 10/2007 | Lindsay | G06F 21/31 |
| | | | | 726/7 |
| 2009/0152343 | A1* | 6/2009 | Carter | G06Q 20/02 |
| | | | | 235/379 |
| 2009/0199264 | A1* | 8/2009 | Lang | G06F 21/31 |
| | | | | 726/1 |
| 2010/0207727 | A1* | 8/2010 | Kanekiyo | G06F 21/32 |
| | | | | 340/5.82 |

(Continued)

*Primary Examiner* — Lindsay M Maguire
*Assistant Examiner* — Michael J Warden
(74) *Attorney, Agent, or Firm* — Fish & Richardson P.C.

(57) ABSTRACT

Techniques are described for determining account features based on a risk assessment. A first set of account features may be determined, including security feature(s) such as mode(s) for authenticating and/or verifying the identity of a user associated with account(s). Based on the first set of features, a risk metric may be determined for the account(s). The risk metric may indicate a risk that fraud may be committed against the account or using the account. Based on the determined risk metric, a second set of account features may be determined for the account(s). The first and second sets of account feature(s) may be applied to the account(s). Disabling a particular feature may cause a reevaluation of the risk metric and a redetermination of the feature sets to be applied to the account(s).

21 Claims, 6 Drawing Sheets

(56) References Cited

U.S. PATENT DOCUMENTS

2011/0202466 A1* 8/2011 Carter ............... G06Q 20/3224
705/67

* cited by examiner

DYNAMIC RISK ASSESSMENT FOR SECURITY FEATURES

CROSS-REFERENCE TO RELATED APPLICATIONS

This application is a continuation application of and claims priority under 35 U.S.C. § 120 to U.S. application Ser. No. 15/592,386, filed on May 11, 2017, which is related to, and claims priority to, U.S. Provisional Patent Application Ser. No. 62/334,527, titled "Dynamic Risk Assessment for Security Features," which was filed on May 11, 2016, the entirety of each of which are incorporated herein by reference.

BACKGROUND

An organization may use any number of computing systems, communications networks, data storage devices, or other types of systems to provide services to users. Moreover, an organization may seek to prevent individuals, processes, or devices from gaining unauthorized access to systems, data, and/or communications to perform fraudulent and/or malicious actions. To reduce the risk of fraud, an organization may implement various security measures. However, greater security and a lower risk of fraud may negatively impact user experience, as users are required to perform a larger number of actions to comply with more rigorous security measures. Accordingly, an organization seeking to prevent fraud may generally attempt to balance security and user experience.

SUMMARY

Implementations of the present disclosure are generally directed to risk assessment for security features of account(s). More specifically, implementations are directed to determining one or more features to apply to an account, such as security features and/or convenience features, based at least partly on a risk metric that indicates a risk of fraud associated with the account.

In general, innovative aspects of the subject matter described in this specification can be embodied in methods that include actions of: identifying a first set of features of at least one account, the first set of features including at least one security feature that is at least partly implemented on a portable computing device associated with a user of the at least one account, the at least one security feature including a biometric authentication feature; calculating a risk metric for the at least one account based at least partly on the first set of features, the risk metric indicating a risk of fraud associated with the at least one account operating with the first set of features; selecting a second set of features for the at least one account based at least partly on the risk metric; and applying the first set of features and the second set of features to the at least one account, including applying the biometric authentication feature to authenticate the user based on biometric data that describes at least one physiological characteristic of the user, the biometric data generated by at least one sensor included in the portable computing device.

Implementations can optionally include one or more of the following features: identifying the first set of features includes receiving an indication of the first set of features selected by the user of the at least one account; the actions further include receiving an indication of at least one change made to the first set of features; the actions further include determining an updated risk metric for the at least one account based at least partly on the at least one change to the first set of features; the actions further include determining an updated second set of features for the at least one account based at least partly on the updated risk metric; the actions further include applying the updated second set of features to the at least one account; the actions further include sending a communication to notify a user of the at least one account that the updated second set of features has been applied to the at least one account; the at least one change to the first set of features is requested by the user; the actions further include sending a communication to notify a user of the at least one account that the updated second set of features relates to the at least one change made to the first set of features by the user; applying the updated second set of features to the at least one account is in response to receiving user confirmation of the updated second set of features that relate to the at least one change; the first set of features further includes one or more of a geolocation feature, a user device registration feature, an authentication token feature, a payment token feature, a direct deposit feature, a check-free account feature, a P2P transfer feature, a geographic account limitation feature, a single-use account number feature, a no-push transfers feature, and a federated identity management feature; the second set of features includes one or more of a no-hold deposit feature, a no-limit withdrawal feature, a password-free account feature, a PIN-free account feature, and a federated identity management feature.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available solutions. By dynamically determining a risk profile (e.g., risk metric) for a user based at least partly on feature(s) applied to an account, and determining other feature(s) based on the risk profile, implementations provide for an automatic balancing of fraud risk relative to cost and user experience in service-providing computing systems. Thus, implementations provide an improvement over traditional computing systems in which costs may not be dynamically adjusted in response to changes in supported features, leading to an imbalance in cost versus risk in the provided service. Such an imbalance typically leads to an expenditure of computing resources as the system attempts to accommodate the increased risk by executing additional security software, thus consuming processing power, active memory, network bandwidth, and/or other computing resources. Through the dynamic feature adjustment as described herein, implementations avoid such use of computing resources and thus use available computing resources more efficiently than previously available systems. Moreover, by dynamically applying security feature(s) to reduce fraud, implementations mitigate the incidence of fraud committed against account(s) maintained by the computing system(s) in which implementations operate. Accordingly, such computing system(s) avoid the expenditure of processing capacity, memory, storage space, network bandwidth, and/or other computing resources that traditional systems would otherwise expend to back out fraudulent transactions, restore lost funds, address security breaches, and/or otherwise respond to incidences of fraud.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for determining account features based on a risk assessment. A first set of features may be determined for one or more accounts. In some implementations, the first set of features includes security feature(s) such as mode(s) for authenticating and/or verifying the identity of a user associated with the account. Security feature(s) may also include constraint(s) on usage of the account, such as location-based constraint(s), constraint(s) on the amount of funds that may be transferred from the account, and so forth. In some examples, the first set of features may be requested by a user associated with the account. Based on the first set of features, a risk metric may be determined for the account and/or the user. The risk metric may indicate a risk that fraud may be committed against the account or using the account. For example, based on the authentication mode(s) included in the first set of features, the risk of fraud may be higher or lower. As a particular example, a risk of fraud may be lower if biometric authentication mode(s) are selected, given that it may be more difficult to fraudulently impersonate an authorized user if biometric authentication (e.g., fingerprint swipe, retinal scan, voice print analysis, facial recognition, etc.) is required to access the account. Based on the determined risk metric, a second set of features may be determined for the account. In some implementations, the second set of features may include convenience features for the account. For example, if the first set of features indicates a low risk of fraud, the convenience features may include no hold period for accessing funds deposited into an account (e.g., deposited funds may be available immediately without any delay). Convenience features may also include no limits on debits from the account, unlimited use of automated teller machines (ATMs), no limits on withdrawals made through ATMs, and so forth.

Implementations may determine a set of features to be offered to a user to apply to the user's account, in which the set of features is determined to balance the risk of fraud relative user convenience. For example, features that provide for greater convenience in account use and access may be associated with security features that mitigate the risk of fraud committed through the account. Accordingly, implementations may provide convenience feature(s) as an incentive for a user to agree to a heightened security regime for their account. In some implementations, the user may pick a first set of features they would like to be associated with their account, and the system may indicate the second set of features that would be required to enable the first set of features. The user may then indicate whether they consent to the first and second sets of features being applied to their account. In this way, implementations may enable the user to tailor their user experience to fit their particular lifestyle and/or manner of transacting through the account, while ensuring that the account is secure against fraud.

In some implementations, an account may be a financial account such as a savings account, checking account, money market account, and/or other type of account with a bank, credit union, or other financial institution. An account may also include other types of financial account(s) such as an investment account, a credit account (e.g., credit card account, loan account, line of credit, etc.), and so forth. An account may also be any other type of account associated with a user, such as an insurance account for life insurance, vehicle insurance, health insurance, homeowner's insurance, and so forth. Implementations may also be employed to manage features of any other suitable types of accounts.

Although examples herein may describe managing an account such as a financial account (e.g., bank account) or service account (e.g., insurance policy account), implementations are not limited to such scenarios. Implementations may also be used to manage features that are applied to accounts such as accounts employed by users to access computing systems, data stores, software applications, online services, and so forth. For example, a risk metric may be determined for a particular user account on a computing system based on a first set of features selected for that user account, and a second set of features may be determined based on the risk metric, e.g., to substantially balance the risk of fraud against the supported sets of features.

As used herein, fraud may include inappropriate and/or unauthorized access to an account. Fraud may also include inappropriate and/or unauthorized use of funds in an account and/or information associated with an account. For example, fraud may include impersonating an authorized user to gain, or attempt to gain, access to the user's account. Fraud may also include transfers of funds out of the account, purchases made using the account, and/or other transactions that are not authorized by the authorized user of the account. Fraud may also include other types of identity theft or identity impersonation, theft or misuse of funds, opening or closing accounts, accessing account history, acquiring confidential information, changing account settings, and so forth.

Figure 1:
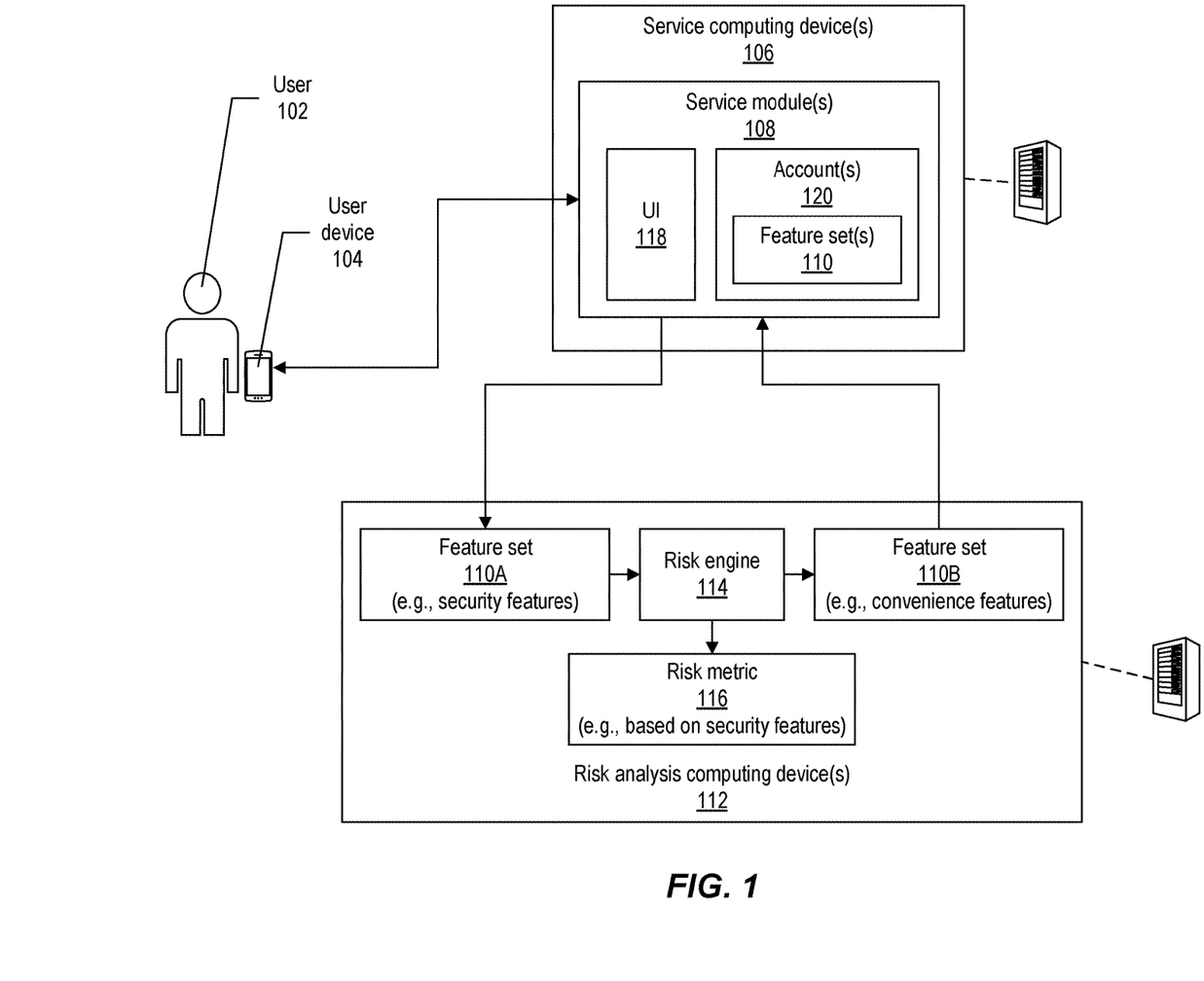
FIG. 1 depicts an example system for determining account features based on a risk assessment, according to implementations of the present disclosure.

FIG. 1 depicts an example system for determining account features based on a risk assessment, according to implementations of the present disclosure. As shown in the example of FIG. 1, the system may include a user device 104 that is owned by, operated by, and/or otherwise associated with a user 102. The user device 104 may be any suitable type of computing device. In some examples, the user device 104 is a portable computing device such as a smartphone, tablet computer, wearable computing device, automotive computer, and so forth. The user device 104 may also include less portable types of computing devices such as laptop computers, desktop computers, and so forth. In some examples, the user device 104 is a publicly accessible computing device such as a public terminal, kiosk, and so forth.

The user 102 may employ the user device 104 to access a service provided by one or more service modules 108 executing on one or more service computing devices 106. The service computing device(s) 106 may include any appropriate number and type of computing device. For example, the service computing device(s) 106 may include one or more server computers, distributed computing devices (e.g., cloud computing devices), and so forth. The service module(s) 108 may provide a financial service such as banking, investment management, and so forth. The service module(s) 108 may also provide other types of service(s) such as insurance. In some instances, the service module(s) 108 may provide multiple services of different types, such as banking, investment management, and insurance. The service may be provided online such as that the user 102 employs the user device 104 to access the service through one or more networks. For example, the user device 104 may execute an application (e.g., an app) that enables the user 102 to view account information, make purchases, schedule funds transfers, change account settings, view transaction history, and so forth through a user interface (UI) 118. The application may be a native application configured to execute on the user device 104. In some instances, the application may be a web application that is configured to execute within a web browser or some other container for web content. The information presented through the application on the user device 104 may be generated by and communicated from the service module(s) 108.

The service module(s) 108 may provide the user 102 with access, through the UI 118, to one or more accounts 120 associated with the user 102. The account(s) 120 may include one or more feature sets 110, as described further below. The user 102 may employ the UI 118 to select a first set of features 110A for the account(s) 120, as described further with reference to FIGS. 2A and 2B. In some implementations, the feature(s) 110A may be security features that control how the account(s) 120 are accessed and/or used to mitigate fraud.

The user's selection of the feature(s) 110A may be communicated to one or more risk analysis computing devices 112. The risk analysis computing device(s) 112 may include any appropriate number and type of computing device. For example, the risk analysis computing device(s) 112 may include one or more server computers, distributed computing devices (e.g., cloud computing devices), and so forth. In some implementations, the risk analysis computing device(s) 112 may execute a risk engine 114. The risk engine 114 may analyze the feature set 110A and determine a risk metric 116 that indicates a level of fraud risk associated with the feature set 110A. In some instances, the risk metric 116 may be evaluated for the account(s) 120 that are associated with a particular user 102. Accordingly, the risk metric 116 may also be described as being associated with the user 102. In some implementations, a separate risk metric 116 may be determined for each of the user's accounts 120, in instances where a particular user 102 has multiple accounts 120 managed by the service module(s) 108. In some implementations, the risk engine 114 may determine an overall risk for the user 102 who has multiple financial and/or non-financial accounts 120. The risk metric 116 may be based on one or more of the feature(s) enabled for the account(s) 120. In some implementations, the risk metric 116 may be further based on the user's past behavior, the user's location, the user's transaction history, the user's credit history, and/or other characteristics of the user 102.

Based at least partly on the risk metric 116, the risk engine 114 may determine a feature set 110B. As described above, the feature set 110B may include one or more convenience features. The determined feature set 110B may be communicated to the service module(s) 108, which may apply the feature(s) 110B to the account(s) 120 for the user 102. In this way, implementations may determine feature(s) 110B based on the selected feature(s) 110A, and provide such feature(s) 110B as an incentive to encourage the user 102 to accept the heightened security feature(s) 110A.

Implementations support any appropriate number and type of features that may be provided for the account(s) 120. The feature(s) 110A (e.g., security feature(s)) may include, but are not limited to, one or more of the following:

A geolocation feature. The user 102 may agree to activate location determining hardware and/or software components of the user device 104, to provide a current location of the user device 104 and/or user 102 to enable the service module(s) 108 to verify that the user 102 and/or user device 104 is where they purport to be during an attempted transaction. The location may be determined, using any suitable technique, to any degree of specificity. For example, the user device 104 may include location sensor(s), transceiver(s), other hardware component(s), and/or other software component(s) configured to determine the location using one or more of the following: an inertial navigation system, a dead-reckoning navigation system, a network positioning system, a radio position finding system, a satellite-based navigation system, an accelerometer system, a gyroscope system, and so forth. The satellite-based system may include one or more of a Global Positioning System (GPS) receiver, a Globalnaya Navigatsionnaya Sputnikovaya Sistema (GLONASS) receiver, a Galileo receiver, an Indian Regional Navigational Satellite System, and so forth. The location may also be determined through geolocation based on an internet protocol (IP) address or other network address of the user device 104.

A biometric authentication feature. The user 102 may agree to have their identity authenticated through the use of biometric data that describes at least one physiological characteristic of the user 102, such as the user's fingerprint(s), retinal scan, heartbeat/pulse, perspiration level, voice print, image(s) of the user's face, neural activity data, and so forth. The biometric data is collected by sensor devices of the user device 104 and/or other device(s), and/or external sensor(s). Implementations support the use of various biometric authentication modes including but not limited to one or more of: fingerprint verification, retinal scan verification, voice print identification, facial recognition, heartbeat or pulse detection (e.g., through video capture), neural activity (e.g., brain wave) scan verification, and so forth. In some instances, the biometric data may be collected during a user's request for authentication to the service module(s) 108, and the collected biometric data may be compared to biometric data that was previously provided (e.g., during a registration process) and stored for the user 102. A correspondence between the current biometric data and the previously collected biometric data may indicate that the user 102 is who they claim to be.

A user device registration feature. The user 102 may have previously registered the user device 104 with the service module(s) 108. Such registration may include providing a unique identifier of the user device 104 to the service module(s) 108 for storage on the service computing device(s) 106 or elsewhere, and associating the stored device identifier with the user 102. Such a unique identifier may be a media access control (MAC) address or any other suitable identifier of the user device 104 and/or a component of the user device 104. In some instances, the service module(s) 108 may generate a unique identifier for the user device 104 (e.g., during registration), and the unique identifier may be stored on the user device 104 and used during subsequent attempts to authenticate the user 102. The user 102 may agree to authentication based at least partly on the user device registration, and successful authentication may depend on providing a device identifier that corresponds to the previously stored device identifier corresponding to the user 102.

An authentication token feature. The user 102 may agree to token-based authentication, in which a token is provided and stored on the user device 104 following a previously successful authentication of the user 102 through login/password, PIN, and/or other authentication mode(s). The token may then be provided to authenticate the user 102 to the service module(s) 108, without the user 102 providing the login/password, PIN, and/or other information used to generate the token. In some instances, the token may have a time-to-live (TTL) such that the token may be valid for a period of time following its generation. In some implementations, the authentication token feature may comply with a version of Open Authentication standard (OAuth). The token generating authority may be a third party such as a social network, internet portal, email service, and/or other online service where the user 102 has an account. In some instances, the token generating authority may be the service (e.g., financial service) managed by the service module(s) 108.

A payment token feature. The user 102 may agree to use a payment token feature to make purchases or otherwise transfer funds to a recipient entity. The payment token feature may allow the use of a token to transfer funds instead of using a credit card network, checks, cash, automated clearing house (ACH) transfer, and/or other channels for funds transfers. The token may be issued to the user 102, e.g., with a particular value, and the issuer may exchange the token for monetary value when the token is redeemed by the entity that received the token from the user 102.

A direct deposit feature. The user 102 may agree that their salary and/or other deposits are to be made directly into the account(s) 120 of the user 102.

A check-free account feature. The user 102 may agree not to use checks (e.g., paper checks) for purchases or other funds transfers. In some instances, the service may not issue checks to the user 102 if the user 102 agrees to this feature.

A P2P transfer feature. The user 102 may agree to use one or more particular P2P transfer channels for transferring funds. The P2P channel may be managed by the service module(s) 108 or a third party.

A geographic account limitation feature. The user 102 may agree to geofencing and/or other location-based limitations on the use of their account(s) 120. For example, the user 102 may indicate that they will not use the account(s) 120 for purchases outside of the user's home state and/or home country.

A virtual account number feature. The user 102 may agree to a virtual account number instead of an actual account number of an account 120. Through this feature, the service module(s) 108 provide the user 102 with a virtual account number that is associated with the actual account number of an account 120. The user 102 may use the virtual account number to make a purchase or perform another transaction. Funds will be withdrawn from the account 120 to complete the transaction, even though the other party to the transaction may not learn the actual account number. In some instances, the virtual account number may be used for a single purchase or other transaction. In such instances, the virtual account number may be described as a single-use or one-time use account number. In some instances, the virtual account number may be used for a period of time to conduct any number of purchases and/or other transactions. The virtual account number may also be described as an alias, substitute account number, disposable account number, virtual card number, disposable credit card number, or substitute credit card number.

A no-push transfers feature. The user 102 may agree that no push transfers of funds will be made from the account(s) 120. Alternatively, the feature may restrict push transfers to using only particular channels for transferring the funds, such as a push transfer channel operated by the service module(s) 108 and not a third party channel.

Transfer and/or purchase amount maximum. The user 102 may agree to a limit on the amount of funds that may be transferred from the account(s) 120 in a particular transfer or during a period of time (e.g., per day). The user 102 may also agree to a limit on the amount of purchase(s) and/or the total value of purchase(s) made during a period of time (e.g., in a day). In some instances, the maximum may be for particular types of purchases and/or transfers. For example, the limit may apply to the purchase of consumer goods but not to other types of transactions.

Participation in a federated identity management system. The user 102 may agree to participated in a federated identity management system, in which the user's identity verification is shared across multiple platforms. Such a federated identity management system is described further below.

Implementations may also support other security features. For example, the user 102 may agree to conduct all their transactions using their user device 104, using a virtual wallet and/or payment mechanisms supported by applications running on the user device 104. As another example, the user 102 may agree to forego ATM rebates for ATM use. Other security feature(s) may also include push alerts to inform the user 102 of account usage.

The feature(s) 110B (e.g., convenience feature(s)) may include, but are not limited to, one or more of the following:

A no-hold deposit feature. If this feature is enabled, the user 102 may be able to access funds from their account(s) 120 immediately after the funds are deposited into the account(s) 120, without a hold period to confirm the validity of the deposit.

A no-limit withdrawal feature. If this feature is enabled, the user 102 may be able to withdraw any amount of funds from their account(s) 120 in a single purchase and/or transaction, or withdraw any total amount of funds through multiple purchases and/or transactions in a particular time period (e.g., a day).

A password-free account feature. If this feature is enabled, the user 102 may be able to access their account(s) 120 without providing a traditional login and password for authentication during a particular access request. For example, authentication may be performed through one or more of biometric authentication, device registration confirmation, authentication tokens (e.g., OAuth), and so forth.

A PIN-free account feature. If this feature is enabled, the user 102 may be able to access their account(s) 120 without providing a traditional PIN for authentication during a particular access request.

Lower fees and/or no fees. If this feature is enabled, the service may forego charging one or more fees that would otherwise be charged to the user 102 for account maintenance, customer service calls, ATM use, overdraws, and so forth. In some implementations, the feature may eliminate some but not all fees, and/or reduce one or more fees compared to their normal amount.

Reduced or eliminated user liability for fraud. If this feature is enabled, the service may reduce or eliminate the amount for which a user 102 may be liable for instances of fraud that occur with regard to the user's account(s) 120.

No minimum balance or reduced minimum balance for accounts. If this feature is enabled, the service may reduce or eliminate the minimum balance that the user 102 is required to keep in one or more accounts 120.

Premium and/or accelerated service. If this feature is enabled, the user 102 may benefit from accelerated (e.g., front of the line) service when they contact customer service. The feature may also provide a heightened level of service, such as customized, personalized, and/or concierge service.

Smart card support. If this feature is enabled, the user 102 may be issued a smart card that carries information for various other cards (e.g., credit, debit, etc.) associated with the account(s) 120. Such a smart card may include near field communications (NFC) chips, radio frequency identification (RFID) chips, and/or other features that enable information to be read from the card using radio-frequency or other types of signals. In some implementations, a smart card may conform with a version of the EMV standard for smart payment cards and readers.

Implementations may also support other convenience features, such as user fraud control preferences. For example, fraud control preferences may specify that a user receive a real time notification (e.g., through text message, email, or otherwise) of charges against an account, transfers from the account, and/or other transactions.

Although examples herein may describe determining convenience feature(s) based on user-selected security feature(s), implementations are not so limited. In some implementations, the user 102 may select convenience feature(s) and the risk analysis computing device(s) 112 may determine the security feature(s) needed to mitigate the fraud risk sufficiently to enable the convenience feature(s). Although particular feature(s) may be described as either security or convenience feature(s), any particular feature may include convenience and/or security aspect(s). For example, lack of a password for user authentication may be a convenience for the user 102 given that a password may be difficult to remember and input, and may also be a security feature given that a password may be compromised.

The security feature(s) 110A may substantially reduce the risk of fraud, thus reducing the potential liability of the service. The security feature(s) 110A may also reduce the operational cost of the service. For example, the no-check feature may reduce the risk of check fraud while eliminating the cost of printing and shipping paper checks to the user 102. The cost savings and/or fraud mitigation due to security feature(s) 110A may enable the service to provide convenience feature(s) 110B to the user 102. For example, the service may be able to eliminate or reduce fees, minimum balances, and/or user liability that was previously used to offset the cost of fraud, given that the enabled security feature(s) 110A operate to reduce or eliminate the risk of fraud.

In some implementations, the service module(s) 108 may support an open and/or pluggable architecture to enable new features to be readily supported by the service module(s) 108 with minimal coding or other development. For example, an open architecture may enable a new form of authentication to be added to the other authentication modes supported by the service module(s) 108. The open architecture may be facilitated through the use of one or more open application programming interfaces (APIs). The open architecture model may extend to the application running on the user device 104, to enable new features to be readily accessed by the user 102 through the user device 104. The open architecture may enable third party developers to create new features to be supported through the service module(s) 108.

The various security features 110A and/or convenience features 110B applied to the account(s) 120 may be implemented, at least in part, on the user device 104. For example, biometric authentication features may be implemented using sensors and/or input devices that are components of the user device 104, such as a camera (e.g., for facial recognition), fingerprint scanner ((e.g., for fingerprint verification), microphone (e.g., for voice print identification), and so forth. As another example, the authentication token feature and/or payment token feature may be implemented using token(s) that were communicated to and stored on the user device 104. As another example, the P2P transfer feature may employ P2P funds transfer channel(s) that are managed through application(s) executing on the user device 104. Convenience features such as the no-password and no-PIN features may be supported by the user device 104 using other types of authentication (e.g., biometric, token-based, device registration, etc.) to verify the identity of the user 102. Because the various supported features are implemented on the user device 104, the user 102 is able to employ their user device 104 (e.g., smartphone) as a common and/or single platform through which the user 102 may access their account(s) 120, manage account settings, request transactions, and/or perform other actions with respect to the account(s) 120. Thus, the user 102 may, if they choose, conduct all their activities with regard to their account(s) 120 using the user device 104, without needing to resort to traditional methods such as swiping a credit card to make a purchase at a store, writing a check to pay a bill, speaking with a bank teller, and so forth. Moreover, the implementations described herein are fundamentally rooted in technology given that the user device 104 is the platform, through which the various security feature(s) and/or convenience feature(s) are integrated to provide a singular user experience for accessing the services.

Although FIG. 1 depicts an example in which the risk engine 114 executes on a separate set of computing device(s) (e.g., the risk analysis computing device(s) 112) than the service module(s) 108, implementations are not limited this example. In some implementations, the risk engine 114 may execute on a same set of one or more computing device(s) as one or more of the service modules 108 that provide the service associated with the account(s) 120. Moreover, the service module(s) 108 may support multiple different types of services, such as financial services (e.g., banking, investments) and non-financial services (e.g., insurance). In such instances, different services may be supported by different service modules 108 executing on different service computing devices 106. The different accounts 120 provided for the user 102 through the different services may also be maintained by different service modules 108 executing on different service computing devices 106.

In some implementations, the available security features 110A and/or the available convenience features 110B includes a feature that the user 102 participates in a federated identity management system. In such a system, the user 102 may initially authenticate themselves to an authority based on one or more credentials (e.g., username, password, PIN, etc.), biometric authentication (e.g., based on heartbeat, fingerprint, facial recognition, voice print recognition, etc.), and/or other modes of authentication. A token may then be generated and communicated to the user device 104 to be stored on the user device 104, the token being associated with the user 102 and indicating that the user 102 has been authenticated with the issuing authority. For example, the token may be configured according to a version of an Open Authorization (OAuth) standard, so other suitable format. When attempting access to other services, the token may be presented to the other services in lieu of the user providing login credentials for the other services, thus providing for easier authentication for the user 102. The other services may agree to participate, with the issuing authority, in the federated identity management system. In some instances, the other services may pay a fee or otherwise provide some value to the issuing authority. For example, the issuing authority may provide more reliable user authentication than other services, through use of biometric authentication for example, and the other services may leverage that reliable authentication by participating in the federated identity management system. A federated identity of a user may also be described as a digital identity. Any appropriate number and/or type of online services may participate in the federated identity management system, including but not limited to financial service providers.

In some instances, if the user 102 opts into the federated identity management feature, the user 102 may indicate which other services can authenticate the user through the federated identity management system. For example, the user 102 may indicate that Bank X, Social Network Y, and E-commerce Platform Z are authorized to authenticate the user 102 through the federated identity management system. The issuing authority (e.g., the entity that operates the risk engine 114) may send messages to the various user-identified services X, Y, and Z, indicating that the services can accept the authority-issued token to authenticate the user 102 when the user attempts access to their services. On an attempted access by the user 102 to one of the designated other services, the other service can provide the token (or information included in the token) to the issuing authority to confirm that the token is valid and associated with the user 102, to authenticate the user 102 to access the other service.

Figure 2A:
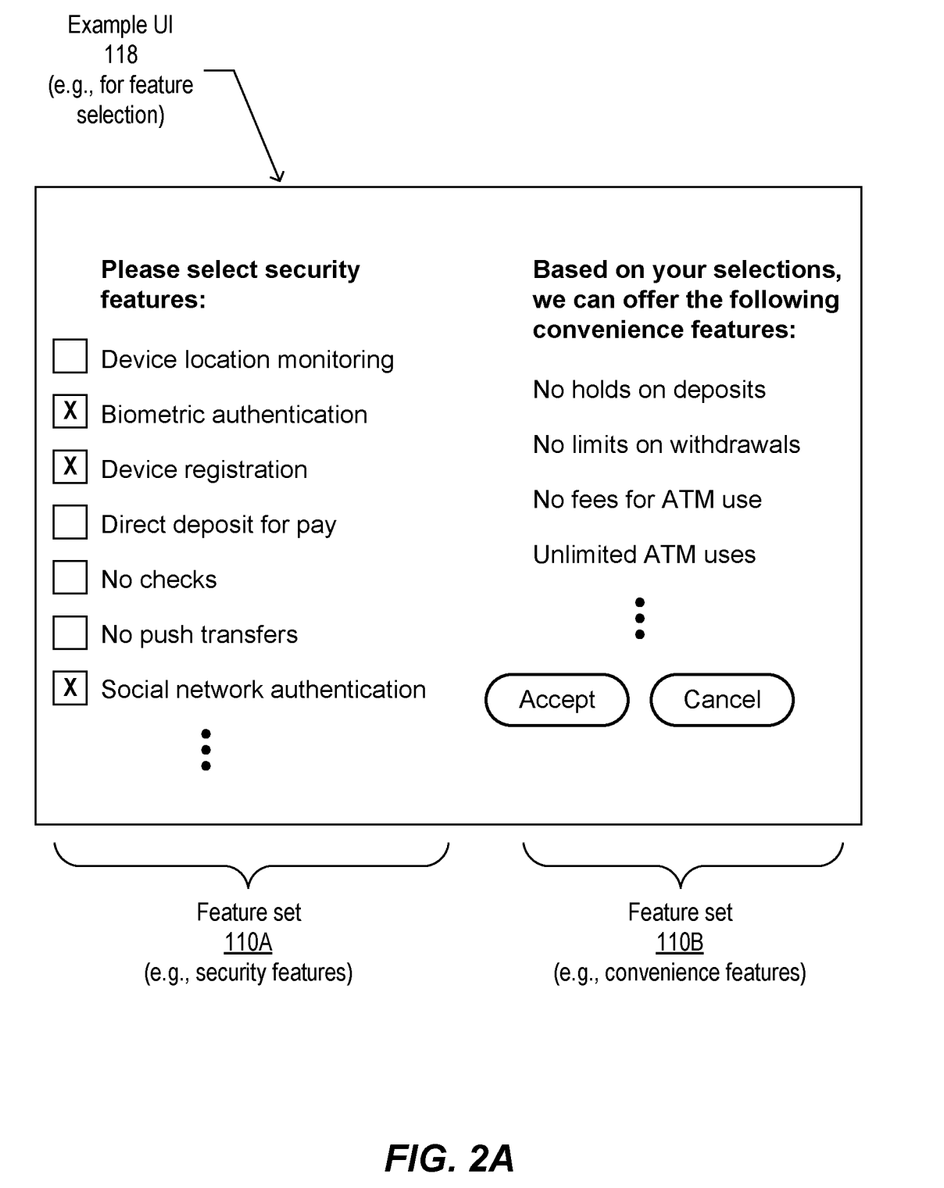
FIGS. 2A and 2B depict example user interfaces, according to implementations of the present disclosure.
Figure 2B:
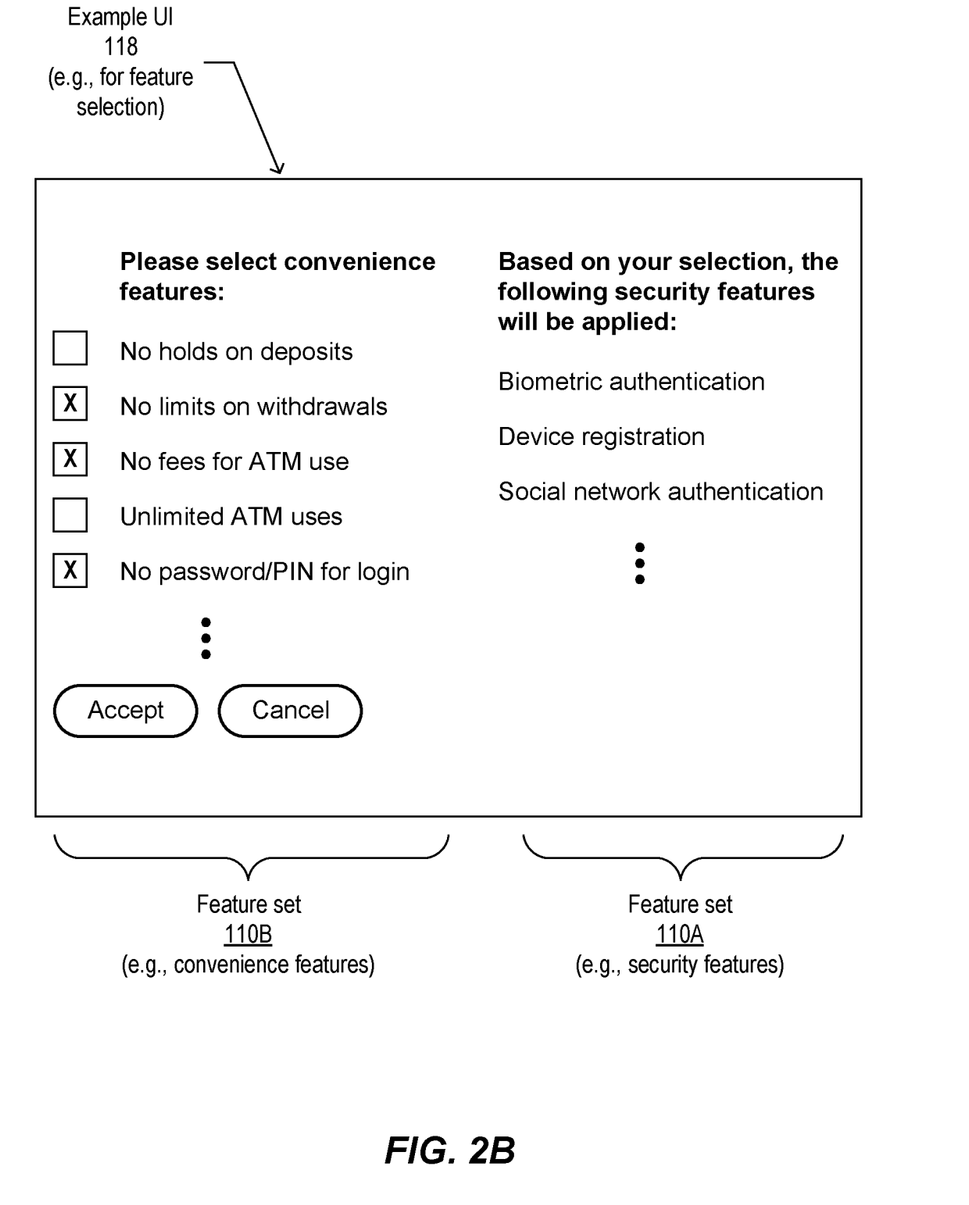

FIGS. 2A and 2B depict example UIs 118, according to implementations of the present disclosure. As shown in the example of FIG. 2A, the UI 118 may present a selectable list of available features 110A. The user 102 may select one or more of the features 110A to apply to the user's account(s) 120. Based on the user's selection, the risk engine 114 may dynamically determine a risk metric 116 and, based on the risk metric 116, determine a set of feature(s) 110B that are offered to the user 102. The user 102 may accept or reject the feature(s) 110B, or alter the selected feature(s) 110A to cause a different set of feature(s) 110B to be determined and presented in the UI 118. In some implementations, the UI 118 may enable the user 102 to select one or more of the features 110B from a list of possible features 110B. In some implementations, the user 102 may be required to opt into a minimum set of feature(s) 110A in order for the user 102 to receive the benefits of any of the convenience feature(s) 110B and/or opt into other security feature(s) 110A. For example, the minimum set of feature(s) 110A may include the biometric authentication feature, the user device registration feature, and the authentication token feature (e.g., depicted as "social network authentication").

FIG. 2A depicts an example in which the user 102 selects security feature(s) 110A and is provided with convenience feature(s) 110B based on the selection. FIG. 2B depicts an example in which the user 102 selects convenience feature(s) 110B and is presented with a set of security feature(s) 110A that would be applied if the user 102 opts into the selected convenience feature(s) 110B. As shown in the example of FIG. 2B, the UI 118 may present a selectable list of available convenience features 110B. The user 102 may select one or more of the features 110B to be applied to the user's account(s) 120. Based on the user's selection, the risk engine 114 may dynamically determine the additional cost that would be incurred by the service due to the selected convenience feature(s) 110B. The risk engine 114 may determine a set of security feature(s) 110A that would substantially offset, meet, and/or exceed the additional cost. In some instances, the presented security feature(s) 110A may include a minimum set of security feature(s) 110A as described above. The security feature(s) 110A may be offered to the user 102. The user 102 may accept or reject the feature(s) 110A, or alter the selected feature(s) 110B to cause a different set of feature(s) 110A to be determined and presented in the UI 118.

In either example, the user's acceptance of the features 110A and 110B may cause the service module(s) 108 to apply the features 110A and 110B to the user's account(s) 120. Determination of feature set(s) 110 for the account(s) 120 is described further with reference to FIG. 3. The service module(s) 108 may continue to monitor the user's account(s) 120 for requested changes in the supported feature set(s) of the account(s) 120. If a requested change is detected, the risk metric 116 may be reevaluated as described further with reference to FIG. 4.

Figure 3:
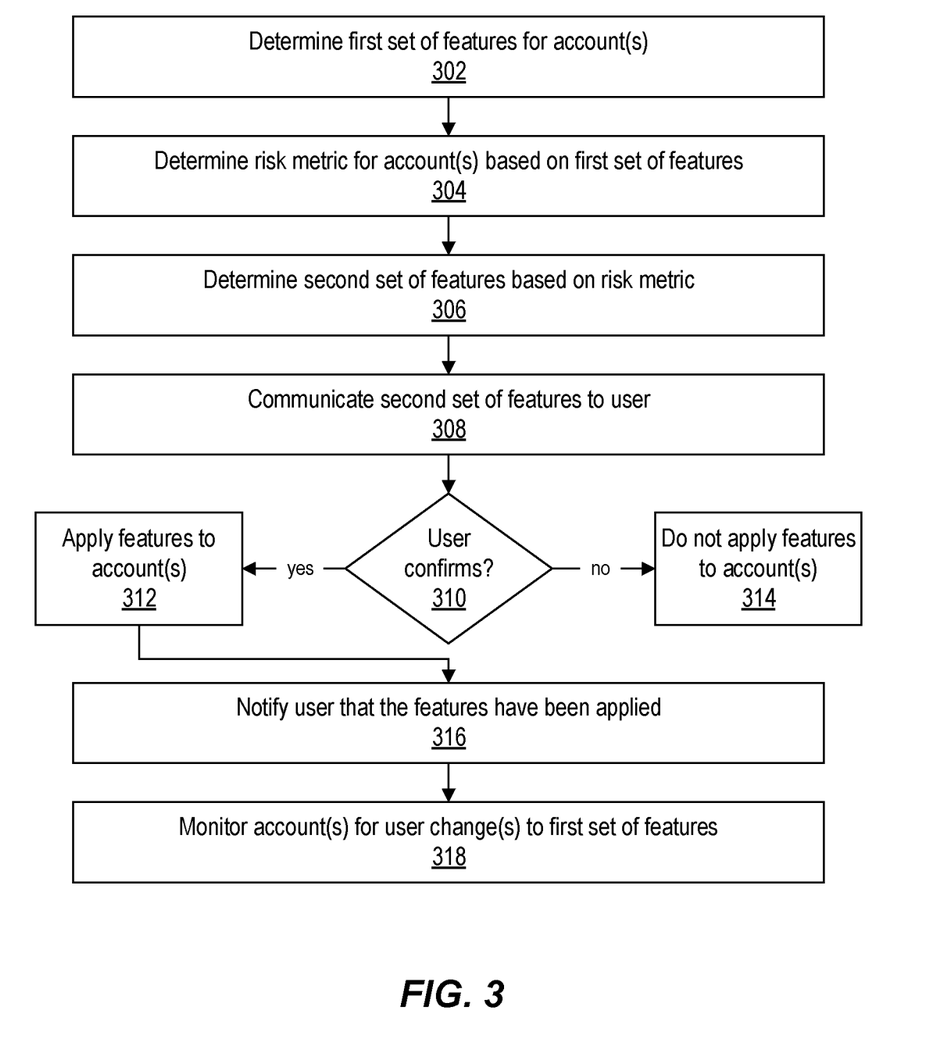
FIG. 3 depicts a flow diagram of an example process for determining account features based on a risk assessment, according to implementations of the present disclosure.

FIG. 3 depicts a flow diagram of an example process for determining account features based on a risk assessment, according to implementations of the present disclosure. Operations of the process may be performed by one or more of the service module(s) 108, the UI 118, the risk engine 114, and/or other software module(s) executing on the user device 104, the service computing device(s) 106, the risk analysis computing device(s) 112, or elsewhere.

A first set of one or more features 110 is determined (302) for the account(s) 120. As described above, the first set of feature(s) 110 may be determined based on a user selection through the UI 118. A risk metric 116 is determined (304) based on the first set of feature(s) 110. A second set of one or more features 110 is determined (306) based on the risk metric 116. The second set of feature(s) 110 may be communicated (308) to the user 102, e.g., through the UI 118. A determination may be made (310) whether the user 102 confirms or rejects the second set of feature(s) 110. If the user 102 confirms, the first and second sets of feature(s) 110 may be applied (312) to the account(s) 120. Application of feature(s) may including altering account settings to activate or de-activate certain feature(s). If the user 102 does not confirm, the feature(s) 110 may not be applied (314). If the user 102 confirms and the feature(s) 110 are applied, the user 102 may be notified (316) that the feature(s) 110 have been applied. The account(s) 120 may be monitored (318) for any user-requested change(s) to the feature(s) applied to the account(s) 120. Change(s) may cause a reevaluation of the risk profile of the user 102, as described with reference to FIG. 4.

In some implementations, determining the risk metric 116 includes calculating the risk metric based on the first set of feature(s). For example, an individual risk metric may be determined for each of the feature(s), and the individual risk metrics may be mathematically combined (e.g., averaged, added, etc.) to determine the overall risk metric 116. The individual risk metric of a feature may be determined based on historical data that indicates a likelihood of an instance of fraud that employs the feature in some way. The likelihood of fraud may be based on a frequency of instances of fraud that have previously occurred, in instances where the fraud exploited in some way a particular vulnerability of the feature. For example, a feature for the use of personal checks may have an individual risk metric that is based on the historical (e.g., in the last year, month, decade, etc.) frequency of instances of check fraud in the user's location (e.g., city, region, neighborhood, etc.).

Figure 4:
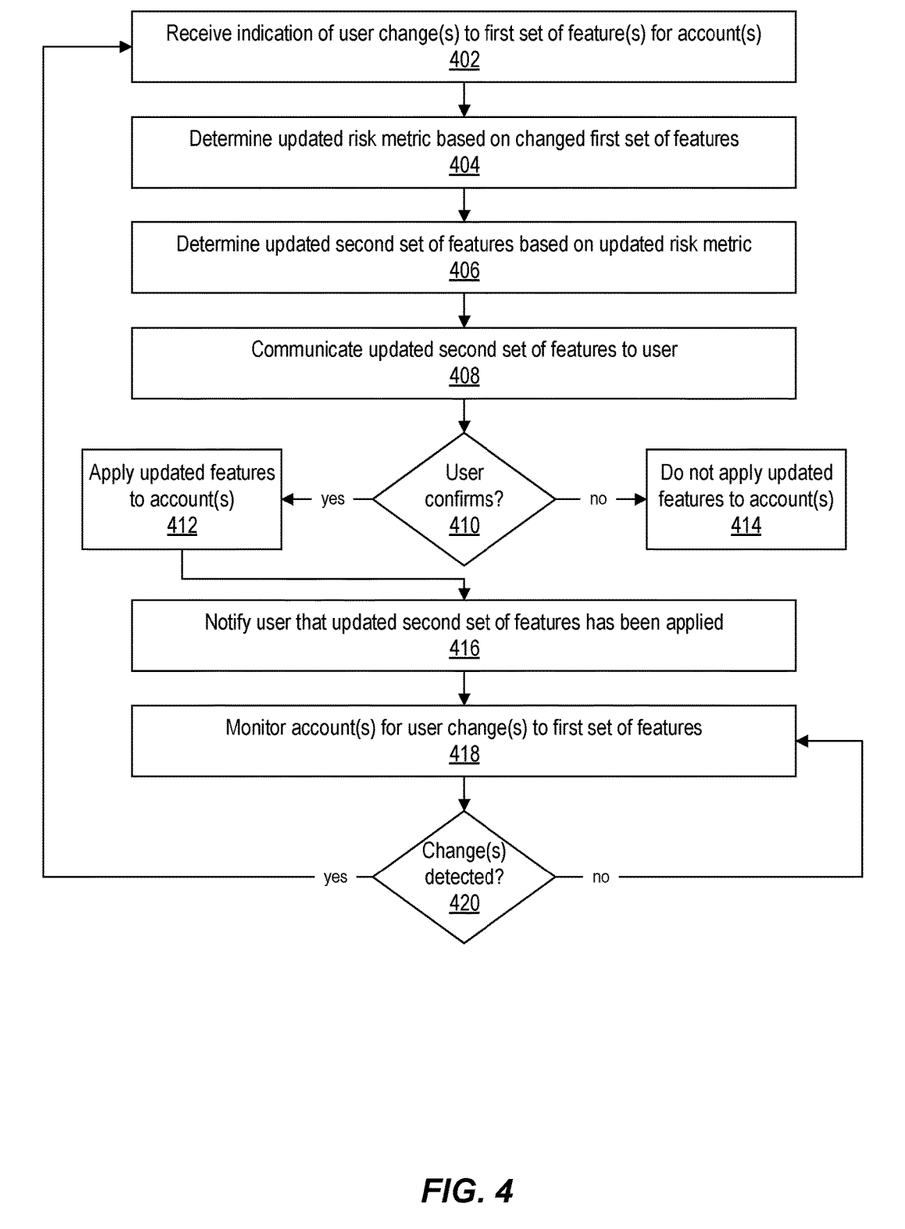
FIG. 4 depicts a flow diagram of an example process for updating account features based on a risk assessment, according to implementations of the present disclosure.

FIG. 4 depicts a flow diagram of an example process for updating account features based on a risk assessment, according to implementations of the present disclosure. Operations of the process may be performed by one or more of the service module(s) 108, the UI 118, the risk engine 114, and/or other software module(s) executing on the user device 104, the service computing device(s) 106, the risk analysis computing device(s) 112, or elsewhere.

An indication may be received (402) of user change(s), or user-requested change(s), to the first set of feature(s) 110 supported by the account(s) 120. In response to the indication, the updated risk metric 116 is determined (404) based on the changed feature(s) 110. An updated second set of feature(s) 110 is determined (406) based on the updated risk metric 116. The updated second set of feature(s) 110 may be communicated (408) to the user 102, e.g., through the UI 118. A determination may be made (410) whether the user 102 confirms or rejects the updated second set of feature(s) 110. If the user 102 confirms, the updated first and second sets of feature(s) 110 may be applied (412) to the account(s) 120. If the user 102 does not confirm, the updated feature(s) 110 may not be applied (414). If the user 102 confirms and the updated feature(s) 110 are applied, the user 102 may be notified (416) that the updated feature(s) 110 have been applied. The account(s) 120 may be monitored (418) for any further user-requested change(s) to the feature(s) applied to the account(s) 120. If such change(s) are detected (420), the process may return to 402 and reevaluate the risk metric 116 based on the updates and rebalance the supported feature set(s) to balance risk against cost to the service and/or convenience to the user 102.

Although examples herein may describe the first set of feature(s) 110 as the security feature(s) 110A and the second set of feature(s) 110 as the convenience feature(s) 110B, implementations are not so limited. For example, the first set of feature(s) 110 selected by the user 102 may include convenience feature(s) 110B and the determined second set of feature(s) 110 may include security feature(s) 110A.

Changes in feature(s) 110 may automatically lead to change(s) in other feature(s) 110 applied to the account(s) 120. For example, if the user 102 decides to disable location determination on the user device 104, such that the service module(s) 108 no longer receive information regarding the location of the user 102 and/or user device 104, the risk of fraud may increase. In response, the user's risk metric 116 may be determined to have increased and certain feature(s) 110 that were previously made available to the user 102 may be withdrawn or disabled. As a particular example, disabling location determination may lead to a higher fraud liability for the user 102, higher account fees, higher minimum balances, deposit holds, withdrawal limits being re-imposed, and so forth.

Feature change(s) may cause a dynamic re-evaluation of the risk metric 116 for the user 102 and/or a dynamic adjustment of the feature(s) 110 applied to the user's account(s) 120. Dynamic actions may also be described as actions performed in real time. Dynamic actions may include actions that can be automatically executed, without requiring human input and without any intentional delay, taking into account the processing limitations of the computing system(s) performing the actions and the time needed to perform the actions. For example, on receiving an indication of user-requested change(s) to the feature(s) 110 of the user's account(s) 120, the risk metric 116 may be re-evaluated and/or the second set of feature(s) 110 may be determined dynamically, e.g., in real time, with respect to receiving the indication of the requested change(s), and the user 102 may be informed of the updated second set of feature(s) 110 dynamically with respect to the determination of the updated second set of feature(s) 110. Accordingly, implementations enable the supported feature set(s) for account(s) 120 to be dynamically rebalanced to maintain the desired level of risk relative to cost to the service and/or user convenience.

Figure 5:
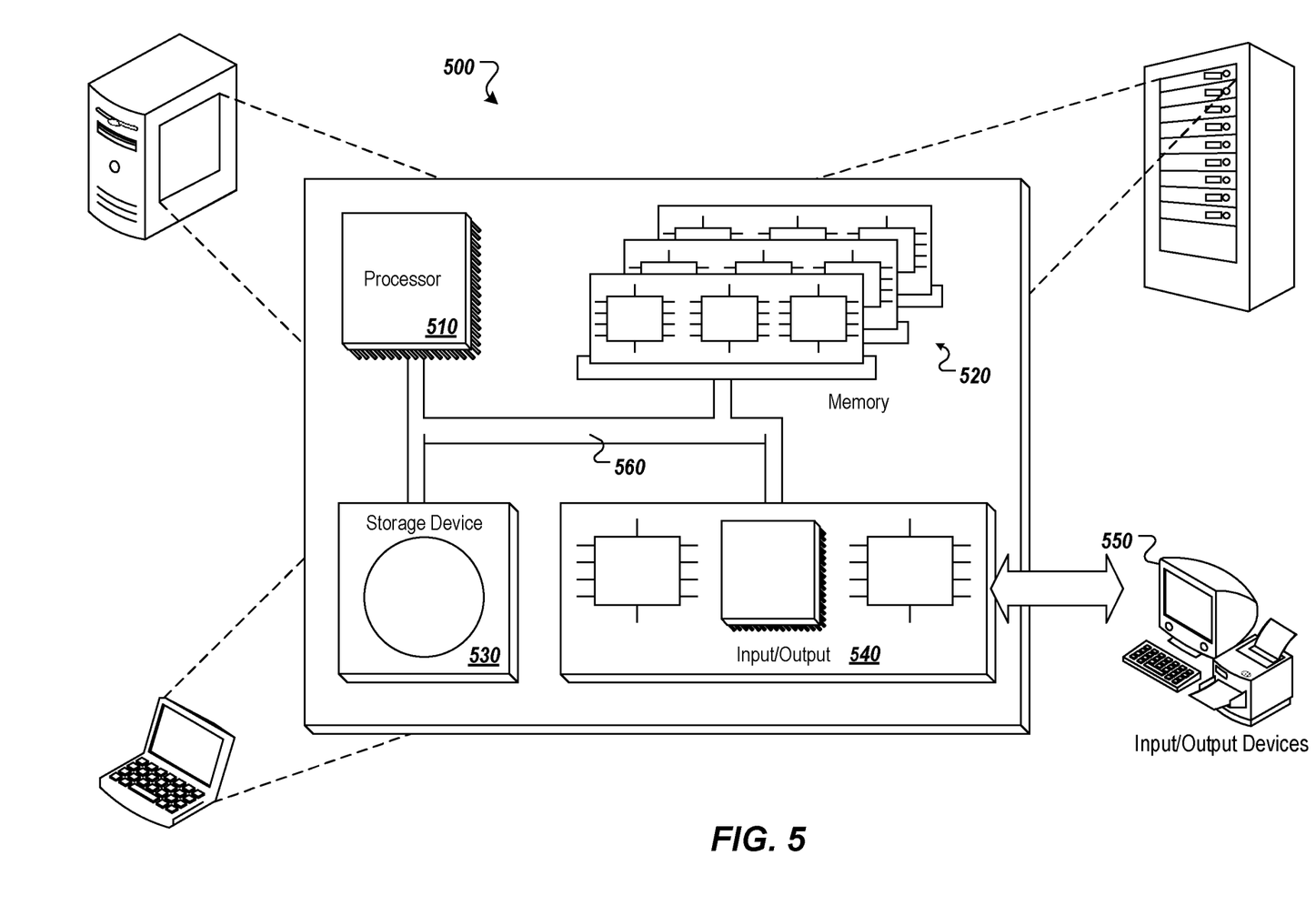
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 104, the service computing device(s) 106, the risk analysis computing device(s) 112, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
    causing, by at least one processor, a user device of a user to render a first graphical user interface on a display of the user device, the first graphical user interface representing a plurality of security features for an account of the user, wherein the plurality of security features comprises at least one of:
- a first feature comprising activating one or more first components of the user device for determining a location of the user device and verifying that the location of the user device matches a purported location associated with a transaction, or
- a second feature comprising activating one or more second components of the user device for obtaining biometric data regarding the user and verifying that the biometric data of the user matches a previously obtained biometric data regarding the user;

receiving, by the at least one processor and through the first graphical user interface, selection data indicating that the user selected a set of security features of the plurality of security features, the set of security features comprising at least one of the first feature or the second feature;

calculating, by the at least one processor, a risk metric for the account based at least partly on the received selection data, the risk metric indicating a risk of fraud associated with the account operating with the set of security features; and mitigating a fraud risk of the account by:
- selecting, by the at least one processor, at least one convenience feature of a plurality of convenience features for the account based at least partly on the risk metric,
- causing, by the at least one processor, the user device to render a second graphical user interface on the display of the user device, the second graphical user interface representing the selected at least one convenience feature and a user-selectable icon prompting the user to confirm that the selected at least one convenience feature is to be applied to the account, and
- applying, by the at least one processor, the set of security features and the selected at least one convenience feature to the account, wherein applying the set of security features and the selected at least one convenience feature to the account comprises:
  - receiving a request from the user device to perform the transaction using the account, and
  - in response to receiving the request from the user device to perform the transaction using the account,
    - performing at least one of:
      - causing the user device to activate the first feature, including activating the one or more first components of the user device to determine the location of the user device and to verify that the location of the user device matches the purported location associated with the transaction, or
      - causing the user device to activate the second feature, including activating the one or more second components of the user device to obtain the biometric data regarding the user and to verify that the biometric data of the user matches the previously obtained biometric data regarding the user,
    - activating the selected at least one convenience feature for the account, and
    - performing the transaction upon at least one of:
      - verifying that the location of the user device matches the purported location associated with the transaction, or
      - verifying that the biometric data of the user matches the previously obtained biometric data regarding the user.

2. The method of claim 1, wherein the plurality of convenience features for the account comprises at least one of:
- a password-free account feature,
- a PIN-free account feature, or
- a federated identity management feature.

3. The method of claim 1, wherein the plurality of security features for the account further comprises at least one of:
- a user device registration feature,
- an authentication token feature,
- a payment token feature,
- a direct deposit feature,
- a check-free account feature,
- a peer to peer (P2P) transfer feature,
- a geographic account limitation feature,
- a single-use account number feature,
- a no-push transfers feature, or
- a federated identity management feature.

4. The method of claim 1, wherein the one or more second components of the user device comprise one or more cameras, and
wherein the biometric data comprises facial recognition data.

5. The method of claim 1, wherein the one or more second components of the user device comprise one or more fingerprint scanners, and
wherein the biometric data comprises finger printer verification data.

6. The method of claim 1, wherein the one or more second components of the user device comprise one or more microphones, and
wherein the biometric data comprises voice print identification data.

7. The method of claim 1, wherein the one or more first components of the user device comprise at least one of:
- an inertial navigation system,
- a dead-reckoning navigation system,
- a network positioning system,
- a radio position finding system,
- a satellite-based navigation system,
- an accelerometer system, or
- a gyroscope system.

8. A system comprising:
- at least one processor; and
- a memory communicatively coupled to the at least one processor, the memory storing instructions which, when executed by the at least one processor, cause the at least one processor to perform operations comprising:
  - causing a user device of a user to render a first graphical user interface on a display of the user device, the first graphical user interface representing a plurality of security features for an account of the user, wherein the plurality of security features comprises at least one of:
    - a first feature comprising activating one or more first components of the user device for determining a location of the user device and verifying that the location of the user device matches a purported location associated with a transaction, or a second feature comprising activating one or more second components of the user device for obtaining biometric data regarding the user and verifying that the biometric data of the user matches a previously obtained biometric data regarding the user;

receiving, through the first graphical user interface, selection data indicating that the user selected a set of security features of the plurality of security features, the set of security features comprising at least one of the first feature or the second feature;

calculating a risk metric for the account based at least partly on the received selection data, the risk metric indicating a risk of fraud associated with the account operating with the set of security features; and mitigating a fraud risk of the account by:
 selecting at least one convenience feature of a plurality of convenience features for the account based at least partly on the risk metric,
 causing the user device to render a second graphical user interface on the display of the user device, the second graphical user interface representing the selected at least one convenience feature and a user-selectable icon prompting the user to confirm that the selected at least one convenience feature is to be applied to the account, and
 applying the set of security features and the selected at least one convenience feature to the account, wherein applying the set of security features and the selected at least one convenience feature to the account comprises:
  receiving a request from the user device to perform the transaction using the account, and
  in response to receiving the request from the user device to perform the transaction using the account,
   performing at least one of:
    causing the user device to activate the first feature, including activating the one or more first components of the user device to determine the location of the user device and to verify that the location of the user device matches the purported location associated with the transaction, or
    causing the user device to activate the second feature, including activating the one or more second components of the user device to obtain the biometric data regarding the user and to verify that the biometric data of the user matches the previously obtained biometric data regarding the user,
   activating the selected at least one convenience feature for the account, and
   performing the transaction upon at least one of:
    verifying that the location of the user device matches the purported location associated with the transaction, or
    verifying that the biometric data of the user matches the previously obtained biometric data regarding the user.

9. The system of claim 8, wherein the plurality of convenience features for the account comprises at least one of:
 a password-free account feature,
 a PIN-free account feature, or
 a federated identity management feature.

10. The system of claim 8, wherein the plurality of security features for the account further comprises at least one of:
 a user device registration feature,
 an authentication token feature,
 a payment token feature,
 a direct deposit feature,
 a check-free account feature,
 a peer to peer (P2P) transfer feature,
 a geographic account limitation feature,
 a single-use account number feature,
 a no-push transfers feature, or
 a federated identity management feature.

11. The system of claim 8, wherein the one or more second components of the user device comprise one or more cameras, and
 wherein the biometric data comprises facial recognition data.

12. The system of claim 8, wherein the one or more second components of the user device comprise one or more fingerprint scanners, and
 wherein the biometric data comprises finger printer verification data.

13. The system of claim 8, wherein the one or more second components of the user device comprise one or more microphones, and
 wherein the biometric data comprises voice print identification data.

14. The system of claim 8, wherein the one or more first components of the user device comprise at least one of:
 an inertial navigation system,
 a dead-reckoning navigation system,
 a network positioning system,
 a radio position finding system,
 a satellite-based navigation system,
 an accelerometer system, or
 a gyroscope system.

15. One or more non-transitory computer-readable media storing instructions which, when executed by at least one processor, cause the at least one processor to perform operations comprising:
 causing a user device of a user to render a first graphical user interface on a display of the user device, the first graphical user interface representing a plurality of security features for an account of the user, wherein the plurality of security features comprises at least one of:
  a first feature comprising activating one or more first components of the user device for determining a location of the user device and verifying that the location of the user device matches a purported location associated with a transaction, or
  a second feature comprising activating one or more second components of the user device for obtaining biometric data regarding the user and verifying that the biometric data of the user matches a previously obtained biometric data regarding the user;
 receiving, through the first graphical user interface, selection data indicating that the user selected a set of security features of the plurality of security features, the set of security features comprising at least one of the first feature or the second feature;
 calculating a risk metric for the account based at least partly on the received selection data, the risk metric indicating a risk of fraud associated with the account operating with the set of security features; and mitigating a fraud risk of the account by:
  selecting at least one convenience feature of a plurality of convenience features for the account based at least partly on the risk metric,
  causing the user device to render a second graphical user interface on the display of the user device, the second graphical user interface representing the selected at least one convenience feature and a user-selectable icon prompting the user to confirm that the selected at least one convenience feature is to be applied to the account, and
  applying the set of security features and the selected at least one convenience feature to the account, wherein applying the set of security features and the selected at least one convenience feature to the account comprises:
    receiving a request from the user device to perform the transaction using the account, and
    in response to receiving the request from the user device to perform the transaction using the account,
      performing at least one of:
        causing the user device to activate the first feature, including activating the one or more first components of the user device to determine the location of the user device and to verify that the location of the user device matches the purported location associated with the transaction, or
        causing the user device to activate the second feature, including activating the one or more second components of the user device to obtain the biometric data regarding the user and to verify that the biometric data of the user matches the previously obtained biometric data regarding the user,
      activating the selected at least one convenience feature for the account, and
      performing the transaction upon at least one of:
        verifying that the location of the user device matches the purported location associated with the transaction, or
        verifying that the biometric data of the user matches the previously obtained biometric data regarding the user.

16. The one or more non-transitory computer-readable media of claim 15, wherein the plurality of convenience features for the account comprises at least one of:
   a password-free account feature,
   a PIN-free account feature, or
   a federated identity management feature.

17. The one or more non-transitory computer-readable media of claim 15, wherein the plurality of security features for the account further comprises at least one of:
   a user device registration feature,
   an authentication token feature,
   a payment token feature,
   a direct deposit feature,
   a check-free account feature,
   a peer to peer (P2P) transfer feature,
   a geographic account limitation feature,
   a single-use account number feature,
   a no-push transfers feature, or
   a federated identity management feature.

18. The one or more non-transitory computer-readable media of claim 15, wherein the one or more second components of the user device comprise one or more cameras, and
   wherein the biometric data comprises facial recognition data.

19. The one or more non-transitory computer-readable media of claim 15, wherein the one or more second components of the user device comprise one or more fingerprint scanners, and
   wherein the biometric data comprises finger printer verification data.

20. The one or more non-transitory computer-readable media of claim 15, wherein the one or more second components of the user device comprise one or more microphones, and
   wherein the biometric data comprises voice print identification data.

21. The one or more non-transitory computer-readable media of claim 15, wherein the one or more first components of the user device comprise at least one of:
   an inertial navigation system,
   a dead-reckoning navigation system,
   a network positioning system,
   a radio position finding system,
   a satellite-based navigation system,
   an accelerometer system, or
   a gyroscope system.

* * * * *